(12) United States Patent
Bergant et al.

(10) Patent No.: US 12,248,443 B2
(45) Date of Patent: Mar. 11, 2025

(54) DATABASE MIGRATION

(71) Applicant: Salesforce, Inc., San Francisco, CA (US)

(72) Inventors: Milena Bergant, San Mateo, CA (US); Hefeng Yuan, Sammamish, WA (US); Hemanth Siddulugari, Dublin, CA (US); Nithya Muthukrishnan, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 69 days.

(21) Appl. No.: 18/178,251

(22) Filed: Mar. 3, 2023

(65) Prior Publication Data
US 2024/0296149 A1    Sep. 5, 2024

(51) Int. Cl.
*G06F 16/21* (2019.01)
*G06F 16/27* (2019.01)

(52) U.S. Cl.
CPC ............ *G06F 16/214* (2019.01); *G06F 16/27* (2019.01)

(58) Field of Classification Search
CPC .............................. G06F 16/214; G06F 16/27
See application file for complete search history.

(56) References Cited

U.S. PATENT DOCUMENTS

| | | | |
|---|---|---|---|
| 7,055,149 B2 | 5/2006 | Birkholz et al. | |
| 7,765,187 B2 | 7/2010 | Bergant et al. | |
| 7,769,722 B1 | 8/2010 | Bergant et al. | |
| 8,706,833 B1 | 4/2014 | Bergant et al. | |
| 8,745,445 B1 | 6/2014 | Choi et al. | |
| 9,910,665 B2 * | 3/2018 | Haferkorn | G06F 8/656 |
| 11,232,067 B2 * | 1/2022 | Chakankar | G06F 3/067 |
| 2005/0267951 A1 | 12/2005 | Joshi et al. | |
| 2006/0218545 A1 | 9/2006 | Taguchi | |
| 2016/0210203 A1 * | 7/2016 | Kumarasamy | G06F 3/067 |
| 2017/0116298 A1 * | 4/2017 | Ravipati | G06F 16/13 |
| 2017/0168903 A1 * | 6/2017 | Dornemann | G06F 11/2038 |
| 2021/0182253 A1 * | 6/2021 | Quesnelle | G06F 11/2094 |
| 2023/0109690 A1 * | 4/2023 | Mutha | G06F 9/5083 718/1 |
| 2023/0171163 A1 * | 6/2023 | Gudipati | H04L 41/0836 |

(Continued)

*Primary Examiner* — Huawen A Peng
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed pertaining to migrating a database between different storage clusters. A computer system identifies a current state of the database that is managed by a database application that enables a client application to access data of the database stored at a first storage cluster. The computer system copies first particular data of the database that is associated with the current state from the first storage cluster to a second storage cluster. After the copying, the computer system transitions the database application into a read-only mode in which it processes read but not write traffic. The computer system copies, from the first storage cluster to the second storage cluster, second particular data of the database that was generated by the database application during the copying of the first particular data. The computer system may also instantiate another instance of the database application in association with the second storage cluster.

17 Claims, 11 Drawing Sheets

(56) References Cited

U.S. PATENT DOCUMENTS

2023/0267014 A1* 8/2023 Mouring, Jr. ......... G06F 9/5088
 718/104
2023/0400995 A1* 12/2023 Waghmare .............. G06F 3/065
2024/0036996 A1* 2/2024 Vijayan ............... G06F 11/2097
2024/0036997 A1* 2/2024 Vijayan ............... G06F 11/0772

* cited by examiner

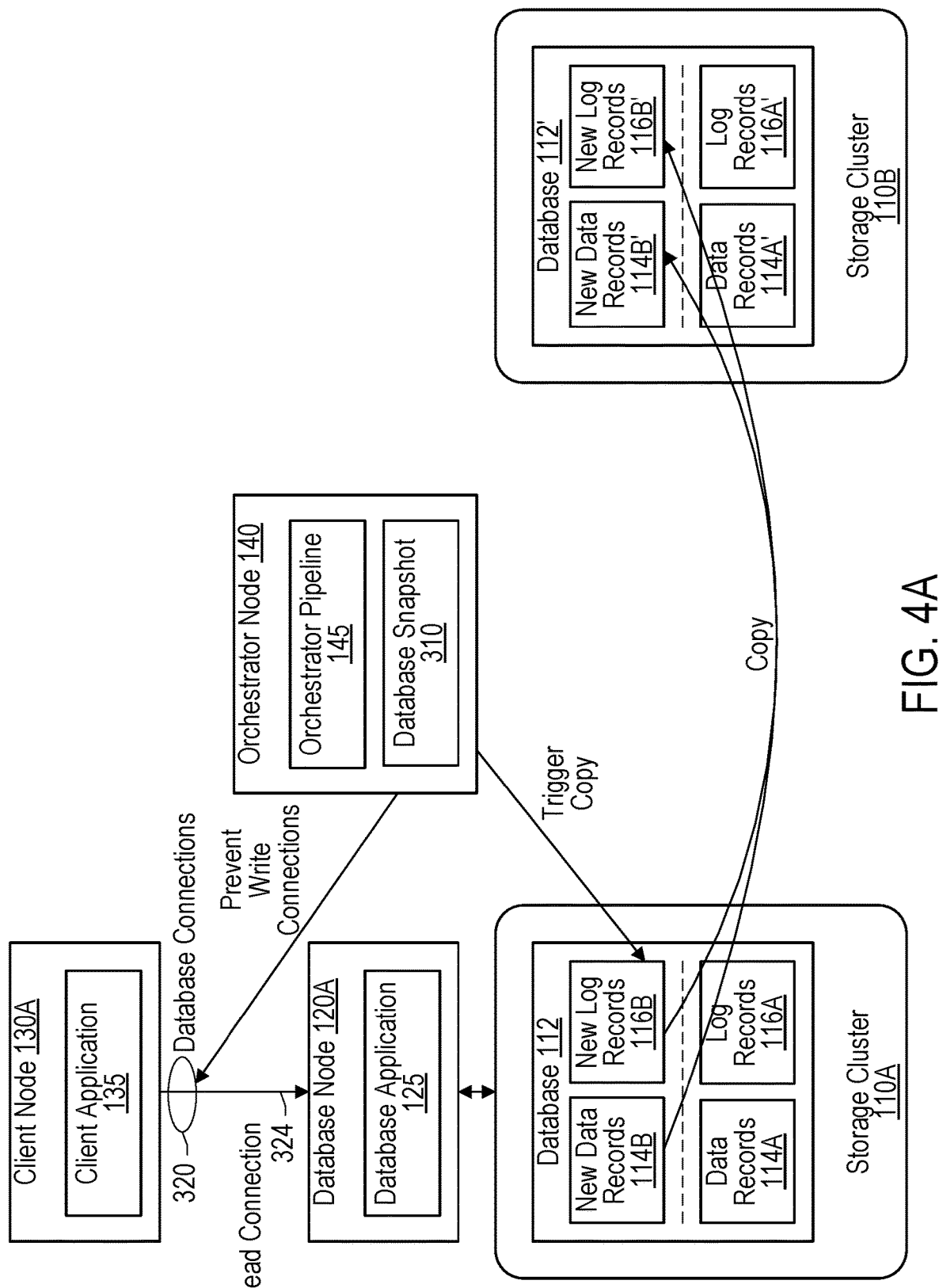

DATABASE MIGRATION

BACKGROUND

Technical Field

This disclosure relates generally to computer systems and, more specifically, to various mechanisms for migrating a database between storage clusters.

Description of the Related Art

Enterprises routinely implement database management systems (or, simply "database systems") that enable users to store a collection of information in an organized manner that can be efficiently accessed and manipulated. A database system can implement any of a variety of different types of databases to store information, such as a relational database, a non-relational database, etc. During operation, a database system receives requests from users via applications or from other systems, such as other database systems, to perform database transactions on the information of a database of that database system. A database transaction can comprise various database statements defining operations that involve reading information out from the database and/or writing information to the database. As part of performing the database transaction, the database system may interact with a storage service (that stores the information of the database) to access or store information associated with the database transaction.

BRIEF DESCRIPTION OF THE DRAWINGS

FIG. 4A is a block diagram illustrating an example transfer of database information that was written during the initial transfer, according to some embodiments.

DETAILED DESCRIPTION

Figure 1:
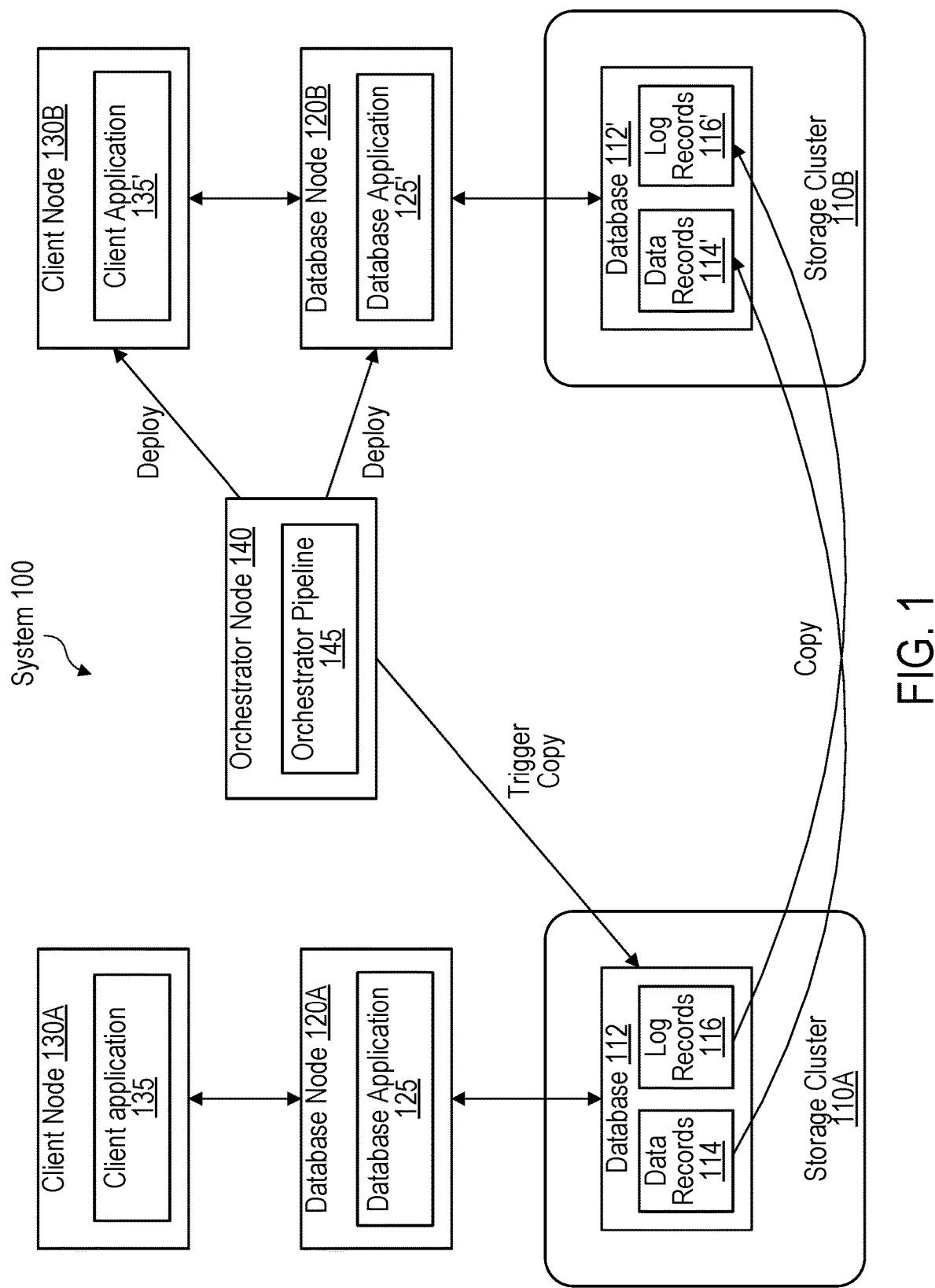
FIG. 1 is a block diagram illustrating example elements of a system capable of migrating a database from one storage cluster to another storage cluster, according to some embodiments.

The data of a user is often stored in a database that is managed by a database application that processes database transactions with respect to that data. In order to access or manipulate the data, or store additional data, a user typically interacts with a client application that provides an interface that permits the user to issue requests pertaining to that data. The client application connects to the database application and causes that database application to execute a database transaction that performs the work requested by the user. In some cases, the data of the database is stored by a storage service that is implemented across multiple storage systems—referred to as a "storage cluster." When accessing or storing data for the database, the database application connects to the storage service and causes it to access or store that data.

In some cases, it may be desirable to migrate the database (or a portion thereof) that is managed by the database application. For example, a storage cluster may be shared by multiple database applications that store the data of their respective database at the storage cluster. The storage cluster might be near or at max capacity and, as a result, it may be desirable to migrate a database application and its data to a different storage cluster. As another example, it may be desirable to migrate a sandbox database or its counterpart production database so that they can be co-located. Conventional migration approaches support the migration of a particular user's data from one database to another if they both share the same storage cluster. But conventional migration approaches do not support the migration of a database application and its associated database between different storage clusters. This disclosure addresses, among other things, the problem of how to perform that migration between different storage clusters without excessive downtime (e.g., without exceeding an acceptable downtime that is identified by a service-level agreement).

In various embodiments described below, when migrating a database between a source storage cluster and a target storage cluster, a system initially identifies the state of the database stored at the source storage cluster at a particular point in time. The system then copies data of the database that corresponds to the identified state from the source storage cluster to the target storage cluster. While that data is being copied, in some embodiments, the database application continues to service read and write requests that are directed at the database stored at the source storage cluster. As a result, users may be unaffected while the bulk of the database is migrated to the target storage cluster. Once the data has been copied, in various embodiments, the system transitions the database application (and its associated client application) to a read-only mode in which the database application processes read but not write traffic (i.e., it does not write new data to the database or update data of the database for the client application). The system may then copy data that was generated by the database application during the copying of the other data that corresponds to the initially identified state. Once the data has been copied, in various embodiments, the system instantiates a new instance of the database application in association with the target storage cluster. The target database application may ready itself and the database residing at the target storage cluster for processing traffic while the system may instantiate a new instance of the client application in association with the target storage cluster. Once that target client application and the target database application have been instantiated, in various embodiment, traffic that is directed at the database is routed to them instead of the source client application and the source database application. The system then deallocates the source client application and the source database application.

These techniques may be advantageous over prior approaches as these techniques allow for the migration of a database application and its associated database between different storage clusters without excessive downtime to users. In particular, by performing the migration in two high-level phases (there can be more phases) in which the bulk of the database is copied in the first phase and then the data generated by a database application during the first phase is coped in the second phase (that data being referred to as the "delta data"), the downtime is minimized. That is, the delta data may be a small portion of the data of the database and thus the downtime may be minimized by permitting the database application to continue to process write requests from users while the bulk of the database is copied instead of preventing write requests directed at the database while the entire database is copied to the target storage cluster. As a result, users may not experience downtime during the first phase, which may last considerably longer than the second phase. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 comprises storage clusters 110A-B, database nodes 120A-B, client nodes 130A-B, and an orchestrator node 140. Also as shown, storage clusters 110A-B include databases 112 and 112', respectively, database nodes 120A-B include database applications 125 and 125', respectively, and also client nodes 130A-B include client applications 135 and 135'. As further depicted, database 112 stores data records 114 and log records 116, database 112' stores data records 114' and logs records 116', and orchestrator node 140 includes an orchestrator pipeline 145. In some cases, the illustrated embodiment may be implemented differently than shown. As an example, storage cluster 110A may be utilized by multiple, different database applications 125 that perform database transactions on behalf of different client applications 135.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, stores, and other entities that are associated with system 100. In various embodiments, system 100 is implemented using a cloud infrastructure that is provided by a cloud provider. Thus, the components of system 100 may utilize the available cloud resources of the cloud infrastructure (e.g., computing resources, storage resources, etc.) to facilitate their operation. As an example, software for implementing database application 125 can be stored on a non-transitory computer-readable storage medium of server-based hardware included in a datacenter of the cloud provider and then executed in a virtual machine hosted on the server-based hardware. In some cases, the software components (e.g., database application 125) are implemented without the assistance of a virtual machine or other deployment technologies, such as containerization. In some embodiments, system 100 is implemented utilizing local or private infrastructure as opposed to a public cloud.

A storage cluster 110, in various embodiments, is a cluster of storage nodes that persists data of one or more databases 112 and enables database applications 125 to perform particular database operations (e.g., access, store, etc.) on the data of those databases 112. A storage node may be a virtual machine in which a storage application is executed that facilitates the storage of data. For example, an entity may instruct a cloud provider to provide a virtual machine that is connected to a set of storage devices and then the entity may deploy a storage application to the virtual machine. The storage application may use the storage devices to store data. In some embodiments, a storage application interacts with multiple storage devices connected together on a network (e.g., a storage attached network (SAN)) and configured to redundantly store data to prevent data loss. Those storage devices may store data persistently and thus a storage cluster 110 can serve as a persistent storage for system 100. In various embodiments, the storage nodes of a storage cluster each execute a respective instance of a storage application, and the instances may interact with each other and collectively implement a storage service. Consequently, data stored for a database 112 may be replicated and/or sharded across multiple storage devices that are managed by different storage nodes. Storage clusters 110A-B are separate groups of storage nodes and may be operated by different entities in some cases.

A database 112, in various embodiments, includes a collection of information arranged in a manner that permits access, storage, and manipulation of that information. A database 112 may include two main types of objects: a data object and a log object. A data object includes a set of data records 114 and may be written when those data records 114 are flushed from a database node 120 to a database 112 as part of a flush operation performed by a database application 125. In various embodiments, a data record 114 comprises data and a key that is usable to look up that data record 114. As an example, a data record 114 may correspond to a row of a database table, where the data record 114 specifies values for attributes of that table. A log object comprises log records 116 describing database operations that are performed as a result of executing database transactions—e.g., if a database application 125 performs an update operation to update a data record 114, then the database application 125 may generate a log record 116 that identifies that the update operation was performed and then may persist that log record 116 in a database 112. Log objects may be append-only and continuously be appended with log records 116 as database transactions do work. In various embodiments, a set of log records 116 forms a transaction log identifying a state of a database 112 implemented by system 100. By reading that transaction log, a database application 125 can determine an ordering in which operations were executed, including an ordering in which transactions were committed with respect to a database 112. Data objects and log objects may take the form of files in some embodiments.

Data objects and log objects, in various embodiments, are associated with object identifiers that can be used to locate them. Consequently, a database application 125 may access data records 114 and log records 116 from a database 112 by issuing access requests having object identifiers to the storage nodes of a storage cluster 110 that implements the relevant database 112. While not shown, in various embodiments, system 100 includes a storage catalog having information about a given database 112, such as the locations of its log objects. When a database application 125 stores a log object, it may store information in the storage catalog that identifies the location of that log object. In some embodiments, a database application 125 stores that information after it is finished appending log records 116 to the log object. When implementing a recovery routine, a database application 125 may utilize the storage catalog to locate log records 116 so that the database operations that are identified by the log records 116 can be replayed in order to restore the database application 125 and its associated database 112 to a restore point.

A database node 120 and a client node 130, in various embodiments, are VMs that have been deployed onto the resources of a target environment (e.g., a public cloud) and are used to execute a database application 125 and a client application 135, respectively. A database node 120 and a client node 130 may be deployed using respective node images that define a software configuration (which can include an operating system) that can be used to deploy an instance of a VM. Amazon Machine Image is one example of a node image. A database node 120 and a client node 130 may connect to storage devices (and other devices, such as network devices) that can be used by the applications executing on those nodes to facilitate their operation. For example, database node 120A may include a solid-state drive that serves as a memory to enable database application 125 to temporarily store data records 114 and log records 116 before they are flushed to storage cluster 110A. In some embodiments, database nodes 120 and client nodes 130 are physical machines that have been deployed to a target environment and may be utilized to execute database applications 125 and client applications 135 without virtualization. A cloud provider may provide direct access to a physical machine instead of a virtual machine.

A database application 125, in various embodiments, is software executable to provide database services, such as data storage, data retrieval, and/or data manipulation. These database services may be provided to other components within system 100 (e.g., client application 135') or to components external to system 100. For example, client application 135' may establish a database connection with database application 125' and send a transaction request to execute a database transaction. A database transaction, in various embodiments, is a logical unit of work (e.g., a set of database operations) to be performed in relation to a database 112. For example, processing a database transaction may include executing a SQL SELECT command to select one or more rows from one or more database tables. The contents of a row may be specified in a data record 114 and therefore database application 125' may access one or more data records 114 from database 112' that correspond to the one or more rows and return the records 114 to client application 135'. Performing a database transaction can include writing data records 114 to a database 112. A database application 125, in various embodiments, initially writes records to an in-memory cache before flushing them to the relevant database 112 after they have been committed. As used herein, the phrase "committing a transaction" or "committing a record" is used in accordance with its well-understood meaning and refers to the process of causing a set of changes made during the transaction to be saved and made visible outside of the entity that performs the transaction.

A client application 135, in various embodiments, is software executable to implement services for users, including interfacing with a database application 125. Examples of client applications 135 include a customer relationship management (CRM) service, an email service, a content streaming service, and a user-provided application (as opposed to an application that is provided by an entity that implements a database 112). A client application 135 may provide services to multiple tenants over a wide-area network, such as the Internet, and may be hosted on or as part of a cloud service. In some embodiments, a client application 135 interfaces with a set of database applications 125 to enable tenants to store and access their data at a database 112. A client application 135 may establish database connections with a database application 125 (e.g., using an application programming interface such as Java Database Connectivity) via which transaction requests can be issued to a database application 125.

Orchestrator node 140, in various embodiments, is a physical or virtual machine that is used to execute orchestrator pipeline 145. Orchestrator pipeline 145, in various embodiments, is an executable pipeline defining a series of stages having respective actions to be performed as part of migrating a database 112 to a different storage cluster 110. Orchestrator pipeline 145 may be automatically or manually invoked in response to the detection of various events. For example, storage cluster 110A might be at or near max capacity and thus orchestrator pipeline 145 can be executed to migrate one or more databases 112 from storage cluster 110A to another storage cluster 110, such as storage cluster 110B, which may have a large amount of available storage capacity. In the illustrated embodiment, database 112 is copied to storage cluster 110B from storage cluster 110A—the copied version is shown as database 112'.

Figure 2:
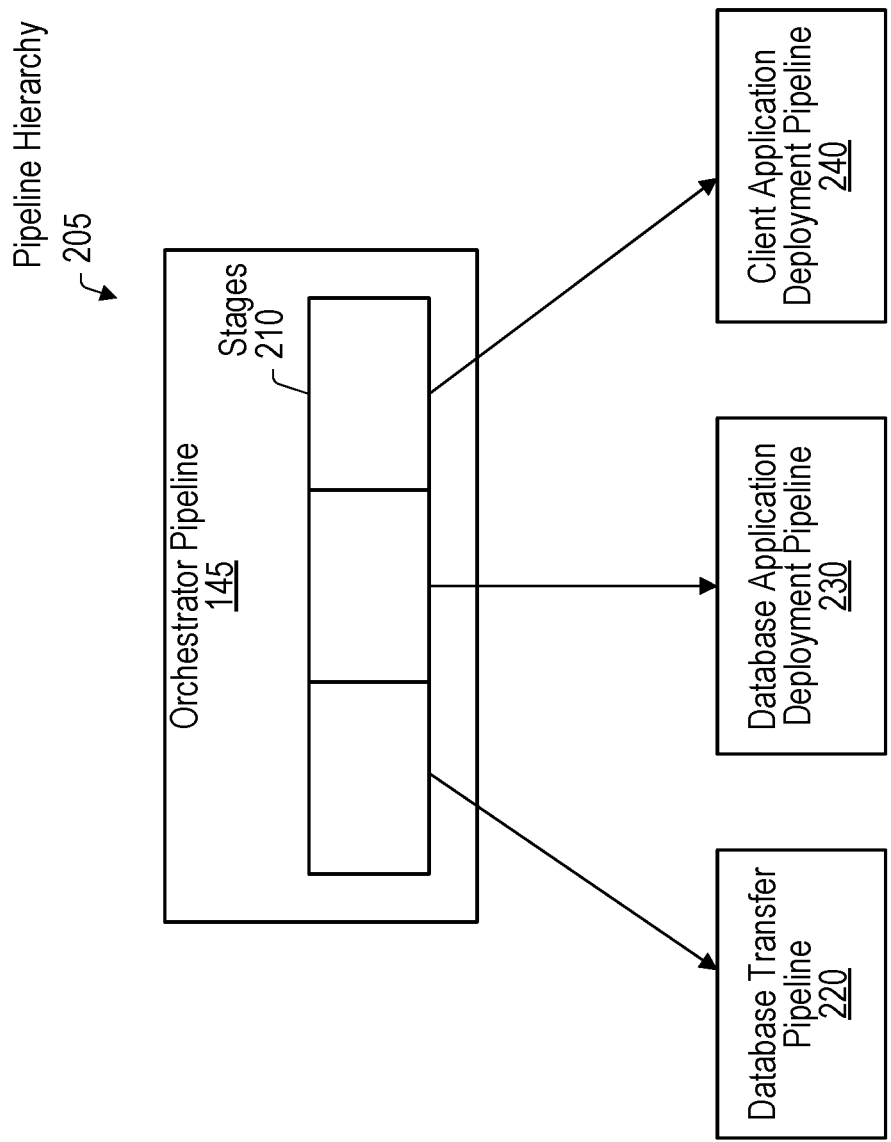
FIG. 2 is a block diagram illustrating example elements of a hierarchy of pipelines that are executable to facilitate the migration of a database, according to some embodiments.
Figure 3:
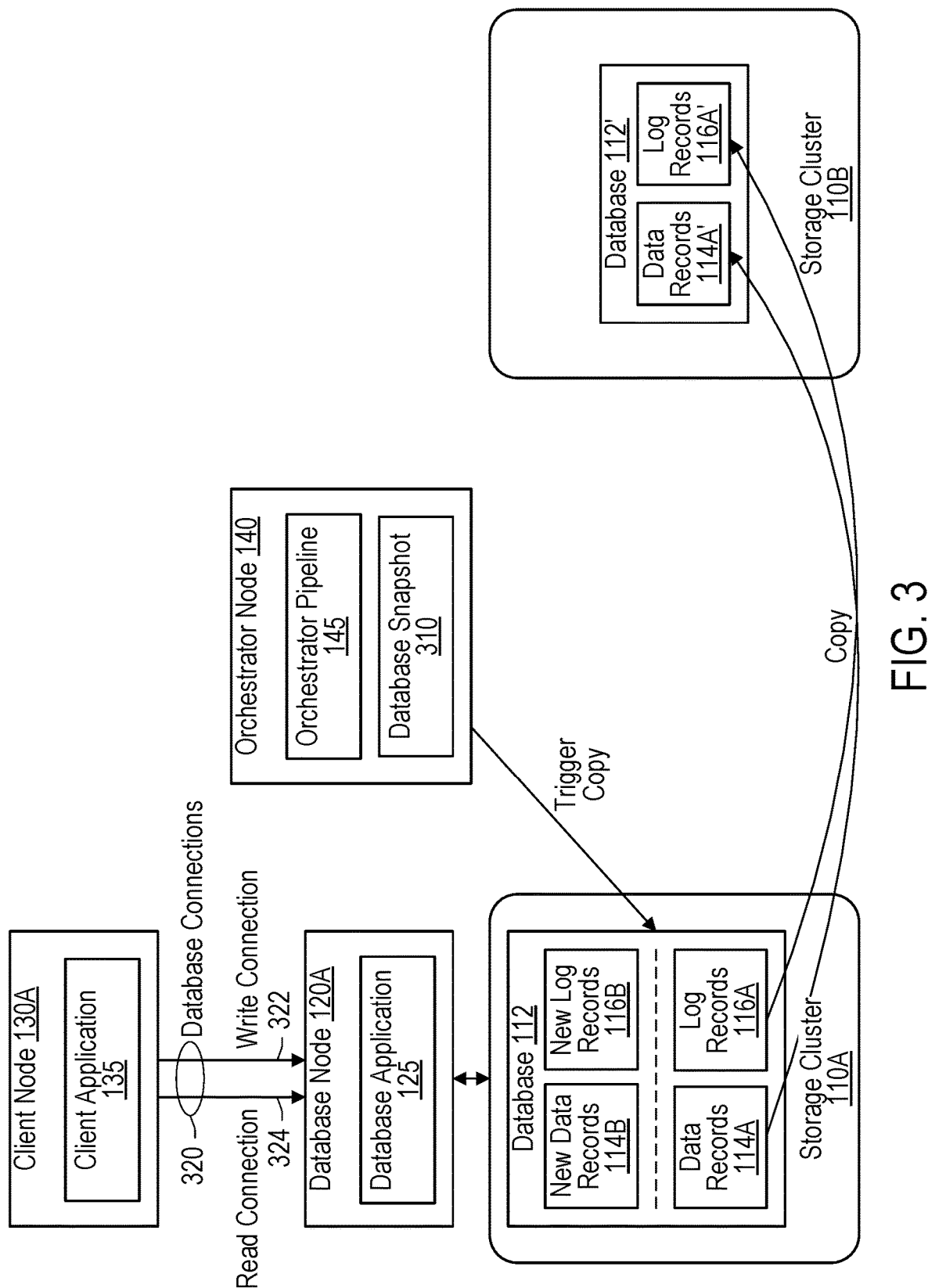
FIG. 3 is a block diagram illustrating an example initial transfer of database information from a source storage cluster to a target storage cluster, according to some embodiments.

As discussed in more detail with respect to FIG. 3, in various embodiments, orchestrator pipeline 145 identifies a state of database 112 at a particular point in time and then causes data records 114 (and log records 116, in some cases) that existed at that particular point in time to be copied to storage cluster 110B and incorporated into database 112'. While that information is copied, database application 125 may continue to service write-based database transactions and thus generate new information that it includes in database 112. As discussed in more detail with respect to FIG. 4A, after the initial information has been copied, orchestrator pipeline 145 transitions database application 125 into a read-only mode in which it can process read but not write traffic. Orchestrator pipeline 145 may then copy at least a portion of the new information (e.g., the new log records 116) into database 112'. As discussed in more detail with respect to FIG. 5, orchestrator pipeline 145 can further deploy a new instance of database application 125 (shown as database application 125') by invoking a database application deployment pipeline of database application 125 (discussed in more detail with respect to FIG. 2). As discussed in more detail with respect to FIG. 6, orchestrator pipeline 145 can deploy a new instance of client application 135 (shown as client application 135') by invoking a client application deployment pipeline of client application 135. Once database application 125' and client application 135' are deployed, then orchestrator pipeline 145 can tear down database 112, database application 125, and client application 135 as discussed in more detail with respect to FIG. 7.

Turning now to FIG. 2, a block diagram of an example pipeline hierarchy 205 that may be implemented during a migration of a database 112 is shown. In the illustrated embodiment, pipeline hierarchy 205 includes orchestrator pipeline 145 (with stages 210) at the top level and a database transfer pipeline 220, a database application deployment pipeline 230, and a client application deployment pipeline 240 at the next level of pipeline hierarchy 205. The illustrated embodiment may be implemented differently than depicted. As an example, database transfer pipeline 220 might be split into two different pipelines: one to copy the initial data and another to copy the delta data.

A pipeline, in various embodiments, is a series of stages 210 in which each stage 210 corresponds to a set of actions to be performed as a part of executing that stage 210. After the set of action of a stage 210 have been completed, a system may then proceed to the next stage of the pipeline. If a certain stage 210 cannot be complete, then the system may jump to a later stage 210 (e.g., a cleanup stage) in the pipeline, skipping one or more intermediate stages 210 of the pipeline. In some cases, the system aborts execution of that pipeline if a stage 210 cannot be completed instead of jumping to another stage 210. In various embodiments, a pipeline can invoke another pipeline as part of its execution. As shown, for example, orchestrator pipeline 145 invokes database transfer pipeline 220, database application deployment pipeline 230, and client application deployment pipeline 240. Orchestrator pipeline 145 may invoke two or more pipelines in parallel. As an example, after data has been copied to a database 112, orchestrator pipeline 145 may invoke database application deployment pipeline 230 and client application deployment pipeline 240 in parallel so that a database application 125 and a client application 135 are deployed at nearly the same time. Orchestrator pipeline 145 may also invoke different stages 210 of a given pipeline at different stages 210 of orchestrator pipeline 145. For example, orchestrator pipeline 145 may invoke database transfer pipeline 220 to perform an initial data transfer from a database 112, then involve another pipeline (not shown) to transition a database application 125 to a read-only mode, and then invoke database transfer pipeline 220 to perform a transfer of the delta data of that database 112 to the target storage cluster 110.

When it is invoked or before being invoked, in various embodiments, a given pipeline can be generated based on information describing the resources to use to facilitate the execution of one or more components that are associated with that pipeline. In particular, infrastructure and configuration information for deploying a given component (e.g., a client application 135) and configuring it can be written in one or more files in accordance with infrastructure-as-code practices. Accordingly, changes to the deployment of a component may be made to those files and then the associated pipeline may be regenerated to incorporate those changes. As discussed in more detail with respect to FIG. 6B, a client application 135 may use a metadata store to find its associated database application 125. As such, when a new instance of the client application 135 is being deployed, the location of the metadata store may be added to its infrastructure and configuration files. Database application deployment pipeline 230 is then be regenerated from those files so that the new instance uses the location information to access the metadata store.

Turning now to FIG. 3, a block diagram of an example initial transfer of information of a database 112 from a storage cluster 110A to a storage cluster 110B is shown. In the illustrated embodiment, there is a database node 120A, a client node 130A, an orchestrator node 140, and storage clusters 110A-B. Also as shown, database node 120A includes a database application 125, client node 130A includes a client application 135, and orchestrator node 140 includes an orchestrator pipeline 145 and a database snapshot 310. As further shown, storage cluster 110A includes a database 112 (having data records 114A, new data records 114B, log records 116A, and also new log records 116B) while storage cluster 110B includes a database 112' (having data records 114A' and log records 116A'). The illustrated embodiment might be implemented differently than shown. For example, log records 116A may not be copied to database 112' and thus database 112' may not store log records 116A'.

In response to receiving a request to migrate database 112 from storage cluster 110A to storage cluster 110B, orchestrator node 140 executes orchestrator pipeline 145. Orchestrator pipeline 145, in various embodiments, initially causes database snapshot 310 to be created for database 112. Database snapshot 310, in various embodiments, identifies the data records 114 and the log records 116 of database 112 at an identified point in time (e.g., when snapshot 310 is created). In some cases, database snapshot 310 may identify only data records 114. In some embodiments, database snapshot 310 identifies information that is included in a storage catalog (discussed above) that, in turn, identifies the data objects and the log objects (having the appropriate records) at the identified point in time. Once database snapshot 310 has been created, then the identified data records 114 and/or log records 116 are copied to the target storage cluster 110B. As depicted, for example, data records 114A and log records 116A are copied to database 112' as data records 114A' and log records 116A'. The generation of database snapshot 310 and the copying of data records 114A and log records 116A may be performed by orchestrator pipeline 145 invoking database transfer pipeline 220. Database transfer pipeline 220 may cause a set of processes to be instantiated at storage cluster 110A and/or storage cluster 110B that select the relevant records (e.g., data records 114A) and send a copy of them to storage cluster 110B for inclusion in database 112'.

While data records 114A and log records 116A are being copied, or only data records 114A in some cases, database application 125 may continue to operate normally. As depicted, while data records 114A and 116A are being copied into database 112', client application 135 continues to establish database connections 320 (e.g., Java Database Connectivity connections) that include both write connections 322 and read connections 324. A write connection 322, in various embodiments, is a database connection that enables an entity, such as client application 135, to write data records 114 to database 112. A write connection 322 may further permit data records 114 to be read from database 112. In contrast, a read connection 324 does not permit a data record 114 to be written to database 112, but it does allow for a data record 114 to be read from database 112. Since write connections 322 are permitted during the initial copying of data to database 112' in various embodiments, database application 125 may write new data records 114 and new log records 116 to database 112. In the illustrated embodiment, new data records 114B and new log records 116B are written to database 112.

Turning now to FIG. 4A, a block diagram of an example transfer of new information of a database 112 that was written during an initial transfer of information from a storage cluster 110A to a storage cluster 110B is shown. The illustrated embodiment includes similar elements to those illustrated in FIG. 3, with differences including database 112' having new data records 114B' and new log records 116B' and no write connections 322 between client application 135 and database application 125. The illustrated embodiment might be implemented differently than shown. For example, new data records 114B' may not be copied to database 112' and thus database 112' may not store data records 114B'.

After copying data records 114A and logs records 116A, or only data records 114A in some cases, to database 112', in various embodiments, orchestrator pipeline 145 then proceeds to copy over new data records 114B and new log records 116B, or only new log records 116B in some cases, to database 112'. Before copying that data, however, orchestrator pipeline 145 may ensure that database application 125 does not write additional records to database 112' or otherwise change the state of records at database 112'. Accordingly, in various embodiments, orchestrator pipeline 145 prevents write connections 322 to database application 125, as shown in FIG. 4A. In order to prevent write connections 322, orchestrator pipeline 145 may update a configuration setting in a database table that causes database application 125 to close existing write connections 322 and causes client application 135 to no longer attempt to establish write connections 322 with database application 125. While write connections 322 are prevented, in some embodiments, client application 135 causes a notification to be presented to users (via a user interface) that indicates that data cannot be written to database 112.

Once there exists no write connections 322 to database application 124 and thus updates cannot be made to database 112 by client application 135, in various embodiments, orchestrator pipeline 145 causes new data records 114B and/or new log records 116B to be copied over into database 112' (shown as new data records 114B' and new log records 116B'). To identify which records to copy over, a timestamp of database snapshot 310 may be used select records having a timestamp greater than (or equal to, in some instances) to the timestamp of database snapshot 310. In various embodiments, once a data object is written, it is immutable and thus to replace its data includes writing a new data object. The new data object may be stamped with a timestamp and flushed from database node 120A to a top level of a log-structured merge tree (LSM tree) that is located at database 112. Accordingly, orchestrator pipeline 145 may cause a set of processes to be spawned at storage cluster 110A that search the upper levels of the LSM tree for records associated with a timestamp that identifies a time later than the point in time that is associated database snapshot 310. In some embodiments, those processes read a transaction log to locate log records 116 having a timestamp that identifies a time later than the point in time. Once the relevant records (e.g., log records 116B) have been identified, those process may send a copy of them to storage cluster 110B for incorporation into database 112'.

Figure 4B:
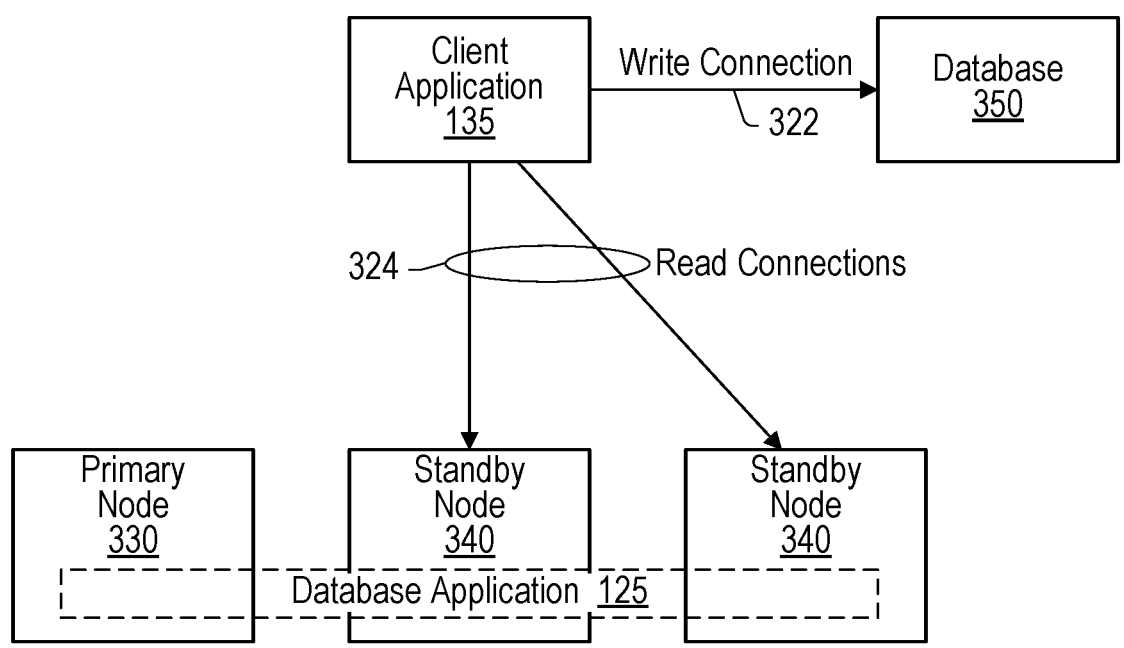
FIG. 4B is a block diagram illustrating an example of a client application and a database application operating in a read-only mode, according to some embodiments.

Turning now to FIG. 4B, a block diagram of an example of a client application 135 and a database application 125 operating in a read-only mode in which write connections 322 to database application 125 are not allowed is shown. In the illustrated embodiment, there is client application 135, a database 350, and database application 125, which is implemented across a primary node 330 and standby nodes 340. The illustrated embodiment might be implemented differently than shown—e.g., no database 350.

In some embodiments, database application 125 is implemented in a distributed manner in which instances of database application 125 are deployed on a cluster of database nodes 120 (referred to a database cluster). Those instances may collectively implement a high-availability application that can conduct a leader election in which one of the instances is elected to be the leader instance that is permitted to write records to a database 112. The database node 120 with the leader instance corresponds to primary node 330 and the database nodes 120 with the non-leader instances (that can process read but not write traffic) correspond to standby nodes 340. As mentioned, before copying the data that was generated during the initial copying discussed with respect to FIG. 3, orchestrator pipeline 145 may prevent write connections 322 to database application 125. In particular, in some embodiments, orchestrator pipeline 145 may cause the database connections 320 to the database application instance residing on primary node 330 to be switched over to standby nodes 340. Because standby nodes 340 do not process write traffic, the write connections 322 to primary node 330 are closed and additional write connections 322 to primary node 330 are prevented. After orchestrator pipeline 145 observes that there are no write connections 322 to primary node 330, in various embodiments, orchestrator pipeline 145 then causes the relevant data to be copied over to the target storage cluster 110. In some cases, orchestrator pipeline 145 waits until primary node 330 has stopped writing log records 116 to its database 112 and then cause the relevant data to be copied over.

It might still be desirable to store certain information while database application 125 is operating the read-only mode. For example, it may be desirable to store information describing login attempts to client application 135. Consequently, in various embodiments, database 350 is made available to client application 135 (and other components of system 100) to store that information. Thus, client application 135 may establish a write connection 322 to database 350 (as shown) and issue requests to store that information. In some embodiments, once the target database 112 is available, that information may be copied over from database 350 to the target database 112.

Figure 5:
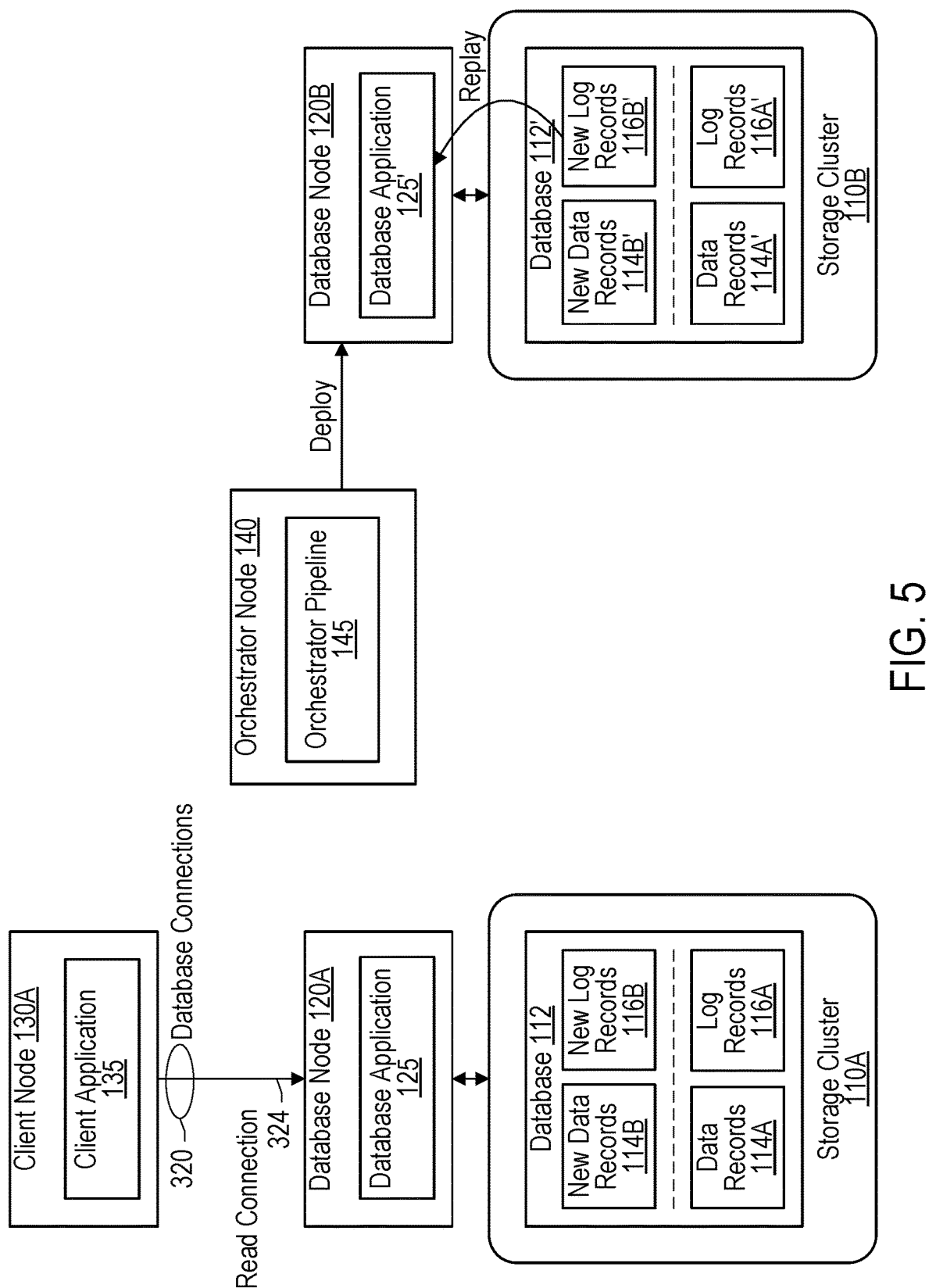
FIG. 5 is a block diagram illustrating an example of instantiating a database application that is capable of interacting with a target storage cluster, according to some embodiments.

Turning now to FIG. 5, a block diagram of instantiating a database application 125 that is capable of interacting with a database 112 of a storage cluster 110 is shown. In the illustrated embodiment, there are storage clusters 110A-B, database nodes 120A-B, a client node 130A, and an orchestrator node 140. As further shown, storage clusters 110A-B includes databases 112 and 112', respectively, database nodes 120A-B include database applications 125 and 125', respectively, client node 130A includes a client application 135 that establishes connections to database application 125, and orchestrator node 140 includes an orchestrator pipeline 145. The illustrated embodiment might be implemented differently than shown. For example, instead of deploying database application 125', orchestrator pipeline 145 may cause database application 125 to manage database 112'.

In some embodiments, instances of database application 125 and client application 135 are immutable. As used herein, the term "immutable" when applied to an instance of a database or client application refers to an instance that once deployed, its operational nature cannot be changed. For example, in some embodiments, once an instance of database application 125 has been deployed, its configuration cannot be changed. While the operational nature of an instance cannot be changed, the data and metadata that may be locally cached by the immutable instance can change over time. As a result of this immutableness of an immutable instance, in order to actualize a change to database application 125/client application 135, a new instance with the change is deployed. Consequently, in some embodiments, database application 125 cannot be changed to manage database 112' and thus a new instance of database application 125 (depicted as database application 125') has to be deployed that is configured to manage database 112' at storage cluster 110B. After data records 114B and log records 116B have been copied, or while those records are being copied to database 112', orchestrator pipeline 145 may invoke database application deployment pipeline 230 to deploy database application 125'.

As a part of its deployment, in various embodiments, database application 125' replays log records 116B'. Database application 125' may replay log records 116B to create a local in-memory cache that existed at database node 120A when database application 125 transitioned to the read-only mode. Also, data records 114B may not be copied over and therefore database application 125' may replay log records 116B in order to create data records 114B'. Replaying a log record 116 may involve database application 125' executing the database operations that are identified by the given log record 116. Accordingly, database application 125' may replay at least a portion of the work that was performed by database application 125 during the initial copying of data (e.g., data records 114A) to storage cluster 110B. The replaying of log records 116B may be a part of a recovery routine in which database application 125' utilizes a storage catalog to locate log records 116B and then replays database operations identified by those log records 116B in order to restore database application 125' and its associated database 112' to a restore point.

Figure 6A:
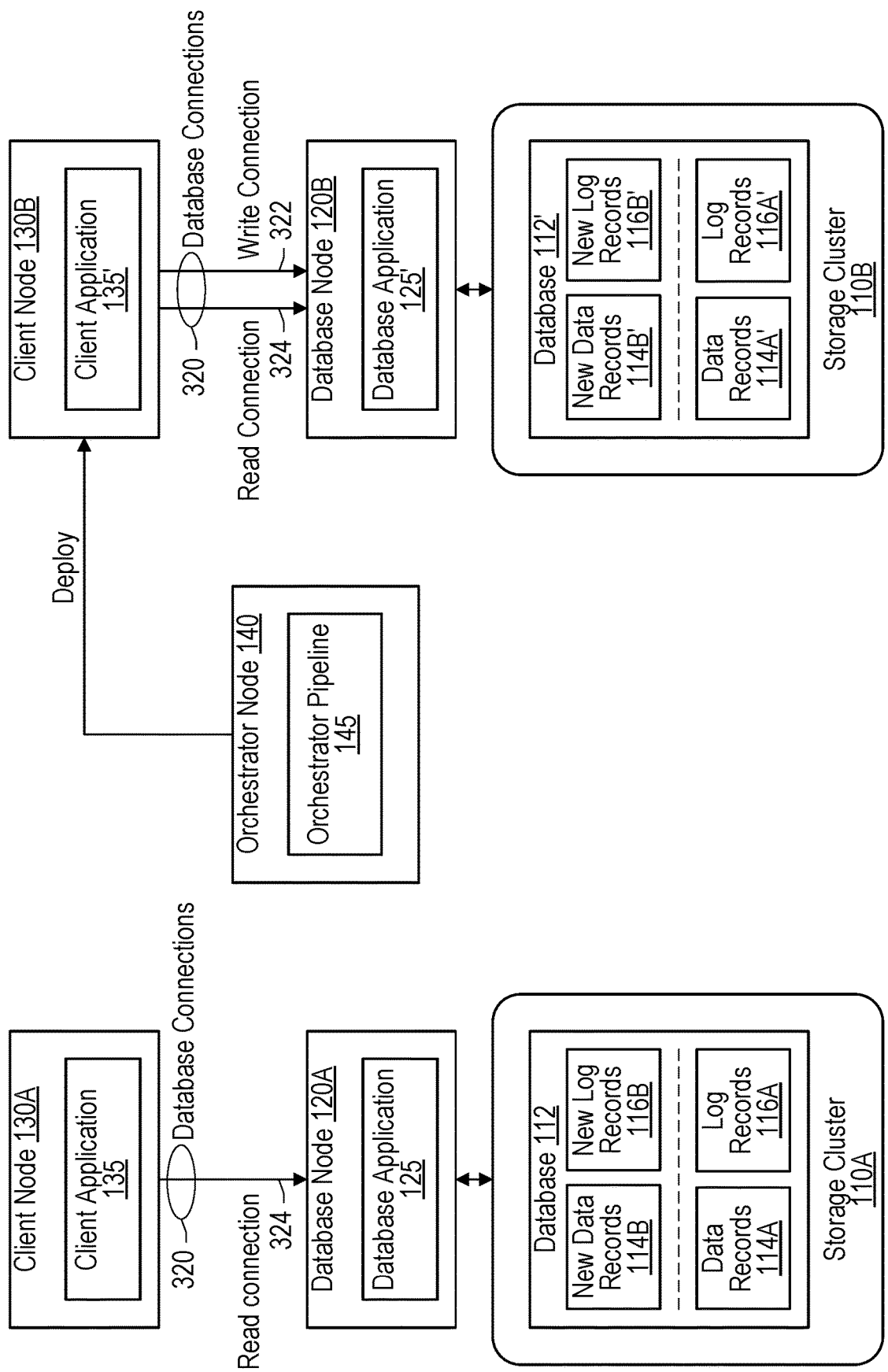
FIG. 6A is a block diagram illustrating an example of instantiating a client application that is capable of interacting with a database application associated with a target storage cluster, according to some embodiments.

Turning now to FIG. 6A, a block diagram of instantiating a client application 135 that is capable of interacting with a database application 125 associated with a storage cluster 110 is shown. The illustrated embodiment includes similar elements to those illustrated in FIG. 5, but with differences including a client node 130B that includes a client application 135'. The illustrated embodiment might be implemented differently than shown. As an example, instead of deploying client application 135', orchestrator pipeline 145 may cause client application 135 to issue requests to database application 125'.

After database application 125' has been deployed, or while database application 125' is being deployed, orchestrator pipeline 145 may invoke client application deployment pipeline 240 to deploy client application 135'. Once client application 135' has been deployed, in some embodiments, orchestrator pipeline 145 causes traffic to flow to client application 135' instead of client application 135. As shown, client application 135' can establish database connections 320 with database application 125' that include write connections 322. Consequently, system 100 may indicate to users that they are permitted to store and update data in the database since database application 125' and client application 135' are ready.

Figure 6B:
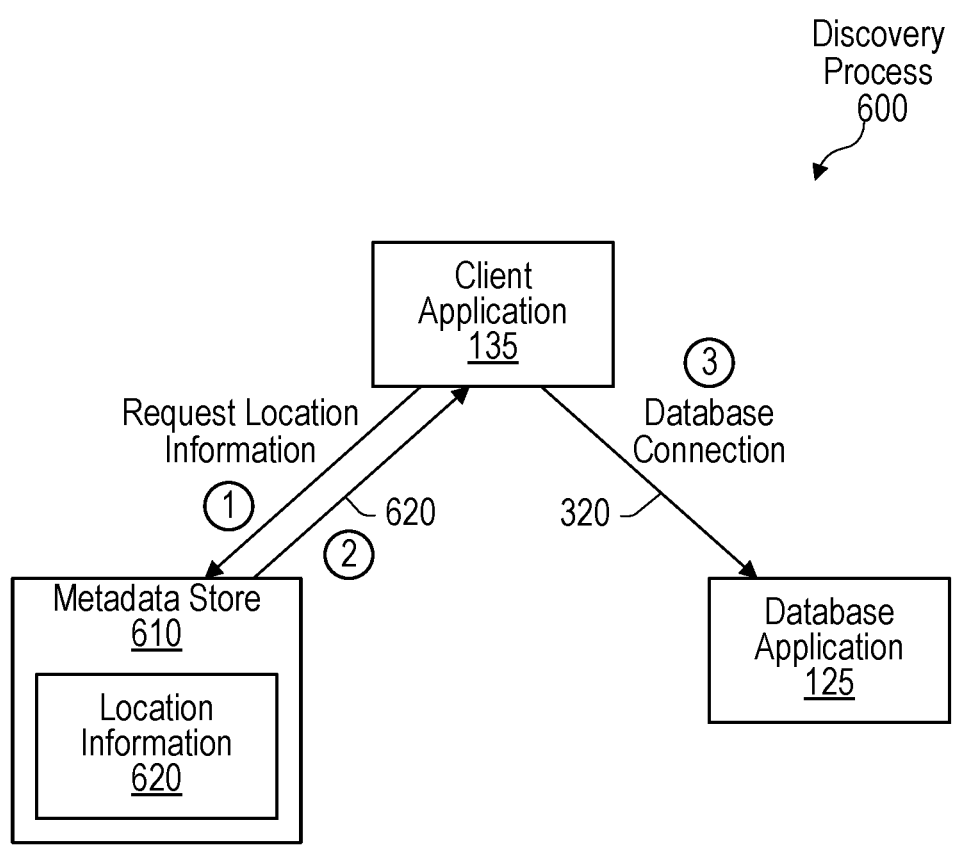
FIG. 6B is a block diagram illustrating an example discovery process that is performed by a client application to discover a database application, according to some embodiments.

Turning now to FIG. 6B, a block diagram of an example discovery process 600 that is performed by a client application 135 in order to discover a database application 125 is shown. In the illustrated embodiment, there is database application 125, client application 135, and a metadata store 610 that stores location information 620. The illustrated embodiment might be implemented differently than shown. As an example, client application 135 may be instantiated with location information 620 instead of accessing it from metadata store 610.

As discussed, in some embodiments, database application 125 may be implemented by various database nodes 120 that hold an election in which one of them is elected to be a primary node 330 whose database instance is permitted to write data records to database 112. In various embodiments, the results of that election (i.e., which node was elected) are stored at metadata store 610. Accordingly, when client application 135 is instantiated, in various embodiments, it issues a request to metadata store 610 for location information (e.g., a uniform resource locator) pertaining to the primary node 330. As such, metadata store 610 returns, to client application 135, location information 620 that permits client application 135 to establish a connection with database application 125 so that client application 135 can issue read and write requests.

In order to locate metadata store 610 so that client application 135 can obtain location information 620 and thus discover the primary instance of database application 125, in various embodiments, client application deployment pipeline 240 inserts, into client application 135's configuration information, a uniform resource locator for metadata store 610. In particular, as explained, client application deployment pipeline 240 may be generated from one or more files describing the resources to use to facilitate the execution of client application 135. Orchestrator pipeline 145 may update those files to reference metadata store 610 and then client application deployment pipeline 240 may regenerated from the files so that it configures client application 135 to connect to metadata store 610. In various embodiments, each database 112 is associated with its own metadata store 610 that stores information (e.g., a storage catalog) describing that database 112. Thus, client application deployment pipeline 240 may be regenerated such that it references the metadata store 610 of the target side instead of the metadata store 610 residing at the source side. Consequently, the updated version of client application deployment pipeline 240 causes the target client application 135 to use a different metadata store 610 than the source client application 135.

Figure 7:
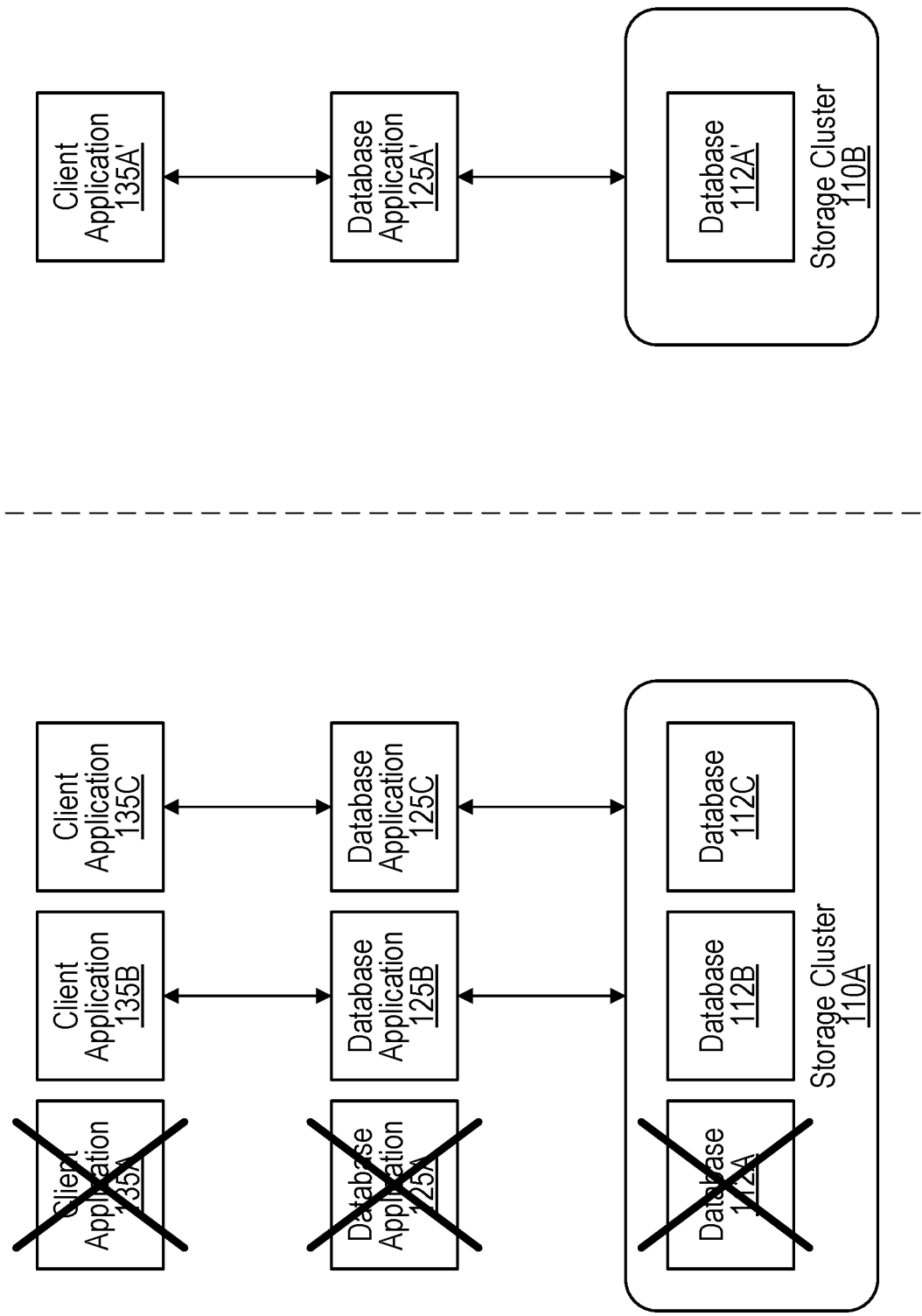
FIG. 7 is a block diagram illustrating an example of deallocating a database, a database application, and a client application that are associated with a source storage cluster, according to some embodiments.

Turning now to FIG. 7, a block diagram of a deallocating of a database 112, a database application 125, and a client application 135 is shown. In the illustrated embodiment, there are storage clusters 110A-B, database applications 125A-C and 125', and client applications 135A-C and 135'. Also as shown, storage cluster 110A includes databases 112A-C and storage cluster 110B includes database 112A'. The illustrated embodiment might be implemented differently than shown. As an example, multiple database applications 125 may utilize the same database 112.

As shown, a storage cluster 110 can store the data of multiple databases 112. In various embodiments, the migration process can be performed to migrate one or more of the databases 112 from a source storage cluster 110 to a target storage cluster 110. As a result, in some cases, only a portion of the total data stored by the source storage cluster 110 may be migrated to the target storage cluster 110—that is, at least one other database 112 might not be migrated to the target storage cluster 110. As illustrated, for example, database 112A is migrated/copied from storage cluster 110A to storage cluster 110B (shown as database 112A'). Furthermore, database application 125A' and client application 135A' are deployed to enable access to database 112A'. Once database application 125A' and client application 135A' have been deployed, in various embodiments, database 112A, database application 125A, and client application 135A are torn down and their resources reclaimed for future use. In some embodiments, database application 125A and client application 135A are torn down as part of the respective deployment pipelines used to deploy database application 125A' and client application 135A'. As an example, once database application 125A' has been deployed and is ready to service traffic, the next stages of its database application deployment pipeline 230 may deallocate database application 125A so that database application 125A's resources are reclaimed.

Figure 8:
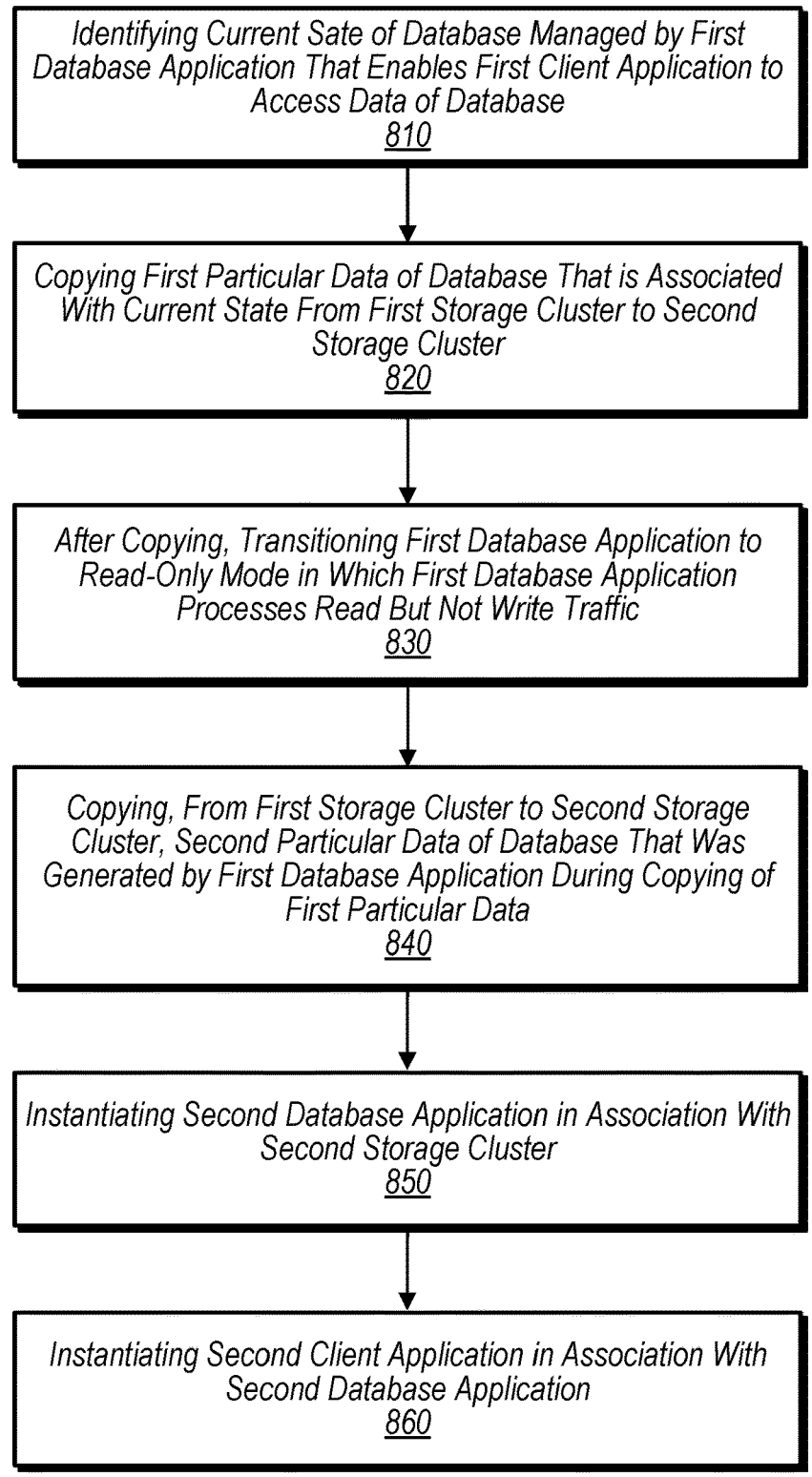
FIG. 8 is a flow diagram illustrating example method that relates to migrating a database from one storage cluster to another storage cluster, according to some embodiments.

Turning now to FIG. 8, a flow diagram of a method 800 is depicted. Method 800 is one embodiment of a method that is performed by a computer system (e.g., system 100) to migrate a database (e.g., a database 112) from a first storage cluster (e.g., storage cluster 110A) to a second storage cluster (e.g., storage cluster 110B). Method 800 may be performed by executing program instructions stored on a non-transitory computer-readable medium. Method 800 may include more or less steps than shown. For example, method 800 may include a step in which the computer system deallocates a database application (e.g., a database application 125) that is associated with the first storage cluster. Also, method 800 may be performed by executing an orchestrator pipeline (e.g., an orchestrator pipeline 145) that invokes respective deployment pipelines for a second database application and a second client application at different stage of the orchestrator pipeline.

Method 800 begins in step 810 with the computer system identifying a current state of the database that is managed by a first database application (e.g., database application 125). The first database application enables a first client application (e.g., client application 135) to access the data of the database. The data of the database is stored at the first storage cluster. In various embodiments, the identifying of the current state of the database includes generating a database snapshot (e.g., a database snapshot 310) that identifies data of the database at a point in time.

In step 820, the computer system copies first particular data (e.g., data records 114A and log records 116A) of the database that is associated with the current state from the first storage cluster to the second storage cluster. In some embodiments, the first and second storage clusters are each implemented by a different set of storage applications and distributed across multiple storage nodes that interface with respective storage devices. In step 830, the computer system transitions the first database application to a read-only mode in which the first database application processes read but not write traffic.

In step 840, the computer system copies, from the first storage cluster to the second storage cluster, second particular data (e.g., new data records 114B and new log records 116B) of the database that was generated by the first database application during the copying of the first particular data. In some embodiments, the second particular data corresponds to only a set of log records that identify database operations performed by the first database application during the copying of the first particular data. The computer system may determine the second particular data by locating data of the database that is associated with a timestamp identifying a time later (and/or equal to, in some cases) than the point in time of the database snapshot. In various embodiments, the copying of the second particular data is performed in response to the computer system determining that all the write database connections (e.g., write connections 322) to the first database application have been closed. In various instances, the first storage cluster stores data for at least one other database (e.g., database 112B). The data of the at least one other database may not be copied to the second storage cluster during the copying of the first and second particular data.

In step 850, the computer system then instantiates a second database application (e.g., database application 125') in association with the second storage cluster. The second database application enables access to the first and second particular data of the database at the second storage cluster.

In various embodiments, that second database application is instantiated such that the second database application replays the database operations identified by the set of log records. The computer system may cause write traffic that is directed at the database to be sent to the second database application instead of the first database application, and the computer system may also deallocate the first database application after instantiating the second database application.

In step 860, the computer system instantiates a second client application (e.g., client application 135') in association with the second database application. In some cases, step 850 may be performed in parallel with step 850. In various embodiments, the computer system instantiates the second client application based on an updated version of a deployment pipeline (e.g., client application deployment pipeline 240) that was used in instantiating the first client application. The updated version of the deployment pipeline may cause the second client application to use a different metadata store (e.g., metadata store 610) than the first client application so that the second client application is able discover the second database application. The updated version may be generated based on information that describes resources to use to facilitate an execution of the second client application. That information may specify the metadata store. In various embodiments, the computer system causes write traffic directed at the database is sent through the second client application instead of the first client application.

Exemplary Computer System

Figure 9:
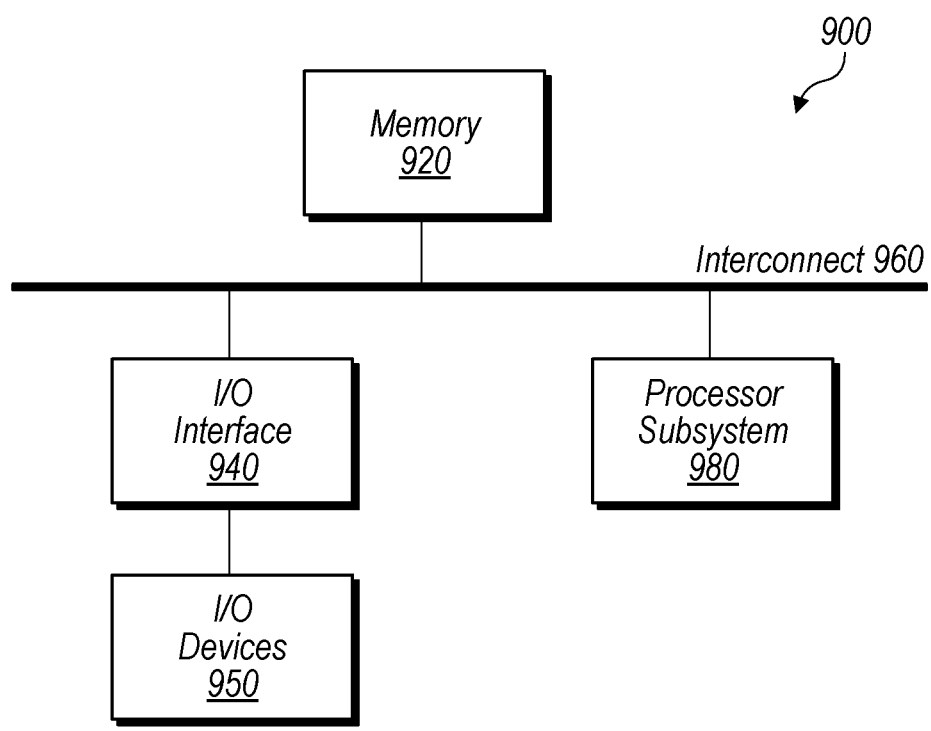
FIG. 9 is a block diagram illustrating elements of a computer system for implementing various systems described in the present disclosure, according to some embodiments.

Turning now to FIG. 9, a block diagram of an exemplary computer system 900, which may implement system 100, a storage cluster 110, a database node 120, a client node 130, or orchestrator node 140, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement a database 112, a database application 125, a client application 135, and/or a pipeline of pipeline hierarchy 205 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method to migrate a database from a first storage cluster to a second storage cluster, the method comprising:
    identifying, by a computer system, a current state of the database that is managed by a first database application that enables a first client application to access data of the database stored at the first storage cluster;
    copying, by the computer system, first particular data of the database that is associated with the current state from the first storage cluster to the second storage cluster;
    after the copying, the computer system:
        transitioning the first database application to a read-only mode; and
        copying, from the first storage cluster to the second storage cluster, second particular data of the database that was generated by the first database application during the copying of the first particular data; and
    instantiating, by the computer system, a second database application in association with the second storage cluster;
    causing, by the computer system, write traffic directed at the database to be sent to the second database application instead of the first database application; and
    deallocating, by the computer system, the first database application after the instantiating of the second database application.

2. The method of claim 1, further comprising:
    instantiating, by the computer system, a second client application based on an updated version of a deployment pipeline used to instantiate the first client application, wherein write traffic directed at the database is sent through the second client application instead of the first client application.

3. The method of claim 2, wherein the updated version of the deployment pipeline causes the second client application to utilize a different metadata store than the first client application to enable the second client application to discover the second database application.

4. The method of claim 2, wherein the method is performed by executing an orchestrator pipeline that invokes respective deployment pipelines for the second database application and the second client application at different stages of the orchestrator pipeline.

5. The method of claim 1, wherein the identifying of the current state includes generating a database snapshot that identifies data of the database at a point in time, and the method further comprising:
    determining, by the computer system, the second particular data by locating data of the database that is associated with a timestamp identifying a time later than the point in time.

6. The method of claim 1, wherein the second particular data corresponds to a set of log records identifying database operations performed by the first database application during the copying of the first particular data, and wherein the second database application is instantiated such that the second database application replays the database operations identified by the set of log records.

7. The method of claim 1, wherein the copying of the second particular data is performed in response to the computer system determining that all write-enabled database connections to the first database application have been closed.

8. The method of claim 1, wherein the first storage cluster stores data for at least one other database, and wherein data of the at least one other database is not copied to the second storage cluster during the copying of the first and second particular data.

9. The method of claim 1, wherein the first and second storage clusters are implemented by different sets of storage applications.

10. A non-transitory computer readable medium having program instructions stored thereon that are capable of causing a computer system to perform operations comprising:
    identifying a current state of a database that is managed by a first database application that enables a first client application to access data of the database that is stored at a first storage cluster;
    copying first particular data of the database that is associated with the current state from the first storage cluster to a second storage cluster;
    after the copying:
        transitioning the first database application to a read-only mode; and
        copying, from the first storage cluster to the second storage cluster, second particular data of the database that was generated by the first database application during the copying of the first particular data; and
    instantiating a second database application that enables access to the first and second particular data of the database at the second storage cluster;
    causing write traffic directed at the database to be sent to the second database application instead of the first database application; and
    deallocating the first database application after the instantiating of the second database application.

11. The non-transitory computer readable medium of claim 10, wherein the operations further comprise:
    instantiating a second client application in association with the second storage cluster that is operable to:
        utilize a metadata store to discover the second database application, wherein the metadata store is different than a separate metadata store used by the first client application to discover the first database application; and
        process write traffic that is directed at the database.

12. The non-transitory computer readable medium of claim 11, wherein the instantiating of the second client application includes:
    generating a deployment pipeline for the second client application based on information describing resources to use to facilitate an execution of the second client application, wherein the information specifies the metadata store.

13. The non-transitory computer readable medium of claim 10, wherein the operations further comprise:
    determining that there are no write-enabled connections to the first database application that are allowed to write data to the database, wherein the copying of the second particular data is performed in response to the determining.

14. A system, comprising:
    at least one processor; and
    a memory having program instructions stored thereon that are executable by the at least one processor to cause the system to perform operations comprising:
    identifying a current state of a database that is managed by a first database application that enables a first client application to access data of the database that is stored at a first storage cluster;
    copying first particular data of the database that is associated with the current state from the first storage cluster to a second storage cluster;
    after the copying:
        transitioning the first database application to a read-only mode; and
        copying, from the first storage cluster to the second storage cluster, second particular data of the database that was generated by the first database application during the copying of the first particular data; and
    instantiating a second database application that enables access to the first and second particular data of the database at the second storage cluster;
    causing write traffic directed at the database to be sent to the second database application instead of the first database application; and
    in response to the second database application being able to service write traffic that is directed at the database, deallocating the first database application.

15. The system of claim 14, wherein the operations further comprise:
    generating a deployment pipeline for a second client application based on information describing a metadata store to be used by the second client application to discover the second database application; and
    instantiating the second client application using the deployment pipeline, wherein write traffic directed at the database is routed through the second database application instead of the first database application.

16. The system of claim 14, wherein the operations further comprise:
    determining that there are no write-enabled connections to the first database application that are allowed to write data to the database, wherein the copying of the second particular data is performed in response to the determining.

17. The system of claim 14, wherein data of the first storage cluster is distributed across a first plurality of storage nodes, and wherein the first and second particular data is copied from the first plurality of storages nodes to a second, separate plurality of storage nodes of the second storage cluster.

* * * * *